No. 818,425. PATENTED APR. 24, 1906.
J. P. EDWARDS.
STOCK WATERING TANK.
APPLICATION FILED JAN. 2, 1906.
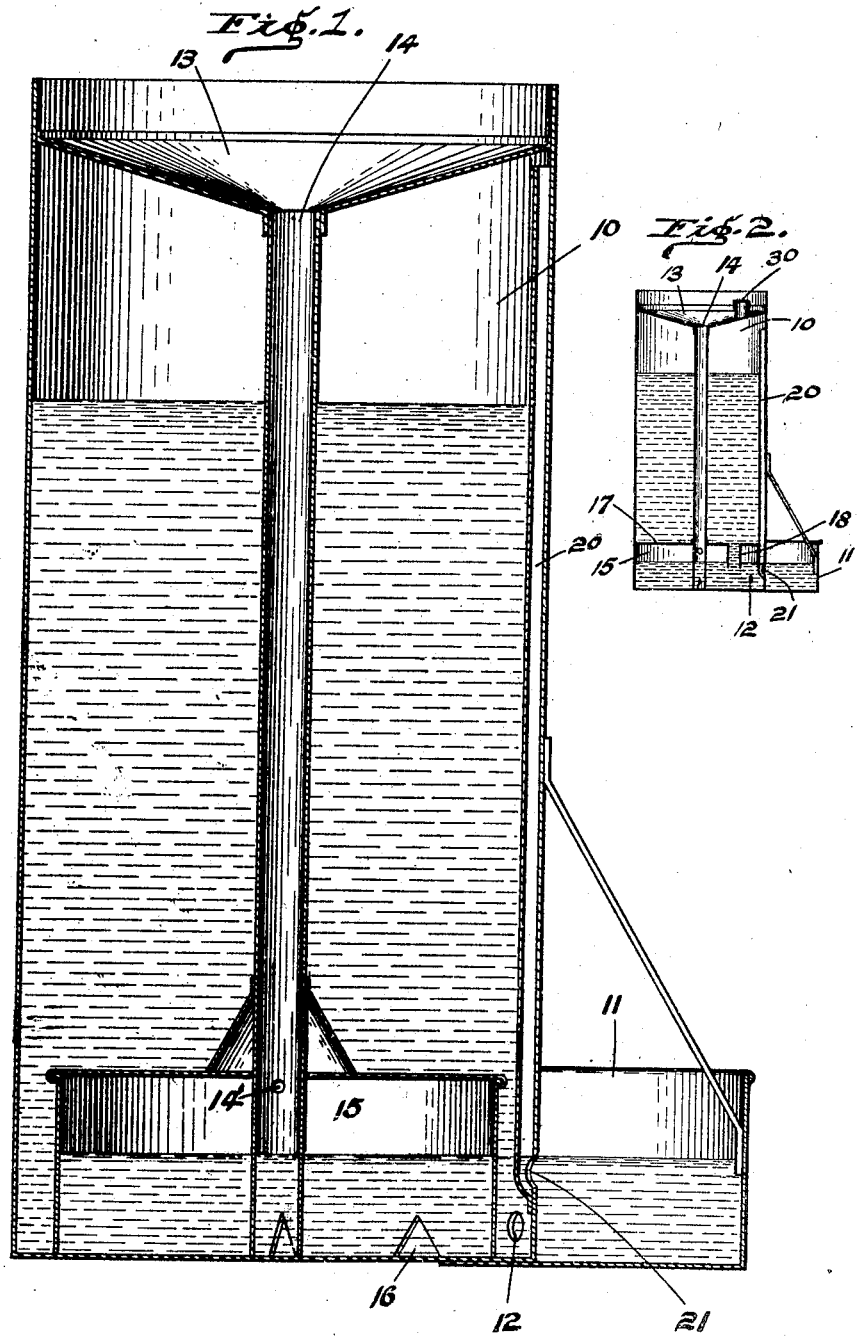
Witnesses
Frank A. Fahle
T. W. McMeans
Inventor
Josiah P. Edwards
BY
Bradford & Hood
Attorneys

UNITED STATES PATENT OFFICE.

JOSIAH P. EDWARDS, OF SHIRLEY, INDIANA, ASSIGNOR, BY DIRECT AND MESNE ASSIGNMENTS, TO GEDGE BROTHERS IRON ROOFING COMPANY, OF ANDERSON, INDIANA, A CORPORATION OF INDIANA.

STOCK-WATERING TANK.

No. 818,425.   Specification of Letters Patent.   Patented April 24, 1906.

Application filed January 2, 1906. Serial No. 294,149.

*To all whom it may concern:*

Be it known that I, JOSIAH P. EDWARDS, a citizen of the United States, residing at Shirley, in the county of Hancock and State of Indiana, have invented certain new and useful Improvements in Stock-Watering Tanks, of which the following is a specification.

The object of my invention is to produce a tank by means of which a supply of fresh drinking-water may be automatically delivered to stock, the construction being such as to prevent overflow of the drinking-basin when the tank is exposed to the sun.

The accompanying drawings illustrate my invention.

Figure 1 is a central vertical section covering an embodiment thereof. Fig. 2 is a similar section on a smaller scale of a modified form.

In the drawings, 10 indicates a suitable reservoir, to the lower side of which is connected a delivery-receptacle 11, which communicates with the interior of the reservoir 10 at a point near its bottom through an opening 12. The upper end of the reservoir 10 is closed by a head 13, which is preferably funnel-shaped to communicate with a pipe 14, which runs downward through the reservoir and communicates at its lower end with an expansion-chamber 15, as indicated by the small opening 14', near the top of the chamber 15.

In the form shown in Fig. 1 the expansion-chamber 15 is of less diameter than the interior of the tank 10, and there is free communication between the interior of the tank and the expansion-chamber through an opening 16, formed through the wall of chamber 15 near its bottom.

In the form shown in Fig. 2 the expansion-chamber 15 is formed by means of a cross-partition 17, which divides the tank 10 into upper and lower compartments. Communication is had from the upper compartment to the expansion-chamber by means of a pipe 18, which passes through the partition 17 and downward some distance into the expansion-chamber.

Arranged within the tank 10 is an air-vent passage 20, the upper end of which communicates with the interior of the tank near its top and the lower end of which communicates with an opening 21, which leads into the delivery-receptacle 11 at a point some distance above the opening 12, but some distance below the top of the delivery-receptacle.

The air-vent passage may be placed outside the tank, so as to enter it near the top, or may be entirely omitted. When omitted, a capped vent 30 should be provided.

The operation is as follows: In order to fill the tank, the opening 12 is plugged by any suitable means. Water is then poured into the cupped cap 13 and flows downward through passage 14 into the expansion-chamber 15 and from thence out and up into the tank 10, the air in the upper part of the tank passing downward through the vent-passage 20. So long as the opening 12 remains plugged the expansion-chamber 15 will remain filled with water; but when said opening 12 is unplugged water will flow out into the delivery-receptacle 11 until it rises high enough to close the opening 21, and thus prevent further ingress of air into the top of tank 10. Thereupon by reason of the fact that the water within the expansion-chamber 15 is in direct communication with the external air through tube 14 the water in the expansion-chamber will drop in level, so as to be practically on a level with the water in the delivery-receptacle 11, the top of the expansion-chamber 15 being higher than the opening 21. If now the entire apparatus be subjected to the heat of the sun, the imprisoned air in the top of tank 10 will expand, thus forcing the water therein downward. The expansion-chamber 15, however, being of an area nearly or quite as large as the area of the tank will permit the water displaced by this expansion to rise in the expansion-chamber, so that the consequent rise in the delivery-receptacle 11 will be comparatively small. If, on the other hand, there were no expansion-chamber 15, the displaced water would rise in the tube 14 and also in the delivery-receptacle 11; but the tube 14 being of comparatively small cross-section would not be able to accommodate a material part of the displaced water, and consequently the water would flow out into the delivery-receptacle 11 and overflow therefrom. The expansion-chamber 15 is an enlargement of the lower end of tube 14, said enlargement being in such form as to produce a maximum expansion-chamber with a minimum diminution of the interior of the tank 10.

I claim as my invention—

1. In a device of the class described, a closed reservoir having upper and lower compartments separated by a transverse partition having an aperture, a drinking-trough connected to said reservoir, a discharge from the lower of said compartments into said drinking-trough and disposed below the upper line of the same, and an equalizing-pipe leading from the lower of said compartments and terminating above the upper of said compartments.

2. In a device of the class described, a closed reservoir having the cover member spaced below the upper rim and provided with an aperture communicating with the interior of the same, a detachable closure to said aperture, a transverse partition dividing the interior of said reservoir into two compartments and having a compartment-connecting aperture, a drinking-trough connected to said reservoir, a discharge from the lower of said compartments into said drinking-trough and disposed below the upper line of the same, and an equalizing-pipe extending through said partition and through said cover member.

3. In a device of the class described, a tank having a headed upper end, and a delivery-receptacle communicating with the interior of said tank near its lower end, of a comparatively large expansion-chamber arranged in the lower end of said tank and communicating with the interior and exterior of the tank.

4. In a device of the class described, a tank having a headed upper end, and a delivery-receptacle communicating with the interior of said tank near its lower end, of a comparatively large expansion-chamber arranged in the lower end of said tank and communicating with the interior of the tank and communicating with the exterior of the tank by a passage the upper end of which extends above the normal level of the liquid within the tank.

5. In a device of the class described, the combination with a tank and a delivery-receptacle communicating therewith near its bottom, of a cover for the upper end of said tank, a tube passing through said cover downward through the tank to a point near its bottom and communicating with an expansion-chamber of comparatively large cubic contents arranged in the lower end of said tank and communicating with the interior of the tank.

In witness whereof I have hereunto set my hand and seal at Indianapolis, Indiana, this 27th day of December, A. D. 1905.

JOSIAH P. EDWARDS. [L. S.]

Witnesses:
ARTHUR M. HOOD,
THOMAS W. MCMEANS.